(No Model.)
J. HARTNESS & E. F. SPAULDING.
LATHE CHUCK.
No. 412,027. Patented Oct. 1, 1889.
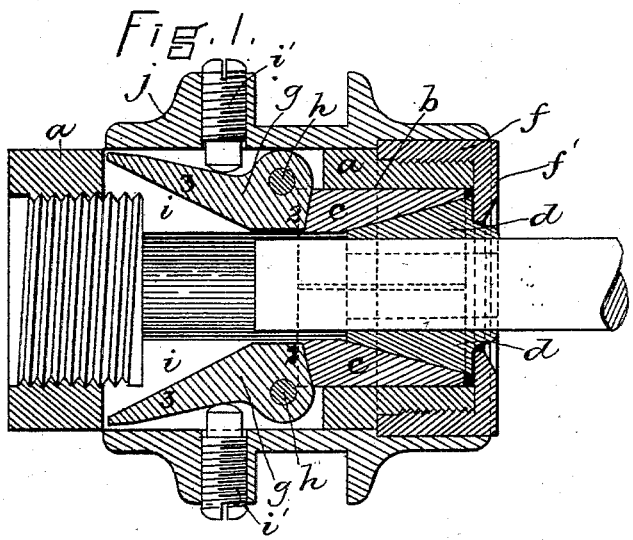
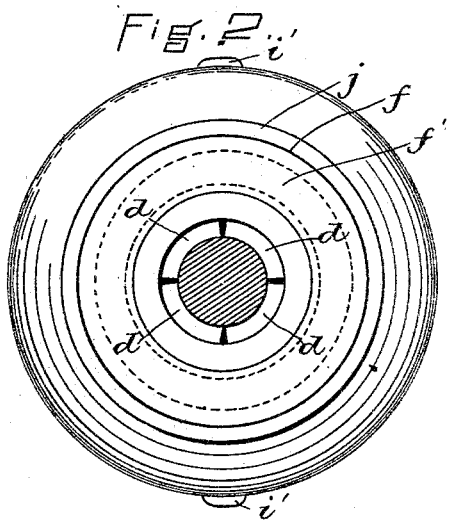
WITNESSES:
H Brown
W. C. Ramsay
INVENTOR:
2 Elisha F. Spaulding
1 James Hartness
by Wright Brown & Crosby
Attys.

UNITED STATES PATENT OFFICE.

JAMES HARTNESS, OF TORRINGTON, CONNECTICUT, AND ELISHA F. SPAULDING, OF WINDSOR, VERMONT, ASSIGNORS TO THE JONES & LAMSON MACHINE COMPANY, OF SPRINGFIELD, VERMONT.

LATHE-CHUCK.

SPECIFICATION forming part of Letters Patent No. 412,027, dated October 1, 1889.

Application filed January 2, 1889. Serial No. 295,185. (No model.)

*To all whom it may concern:*

Be it known that we, JAMES HARTNESS, of Torrington, in the county of Litchfield and State of Connecticut, and ELISHA F. SPAULDING, of Windsor, in the county of Windsor and State of Vermont, have invented certain new and useful Improvements in Chucks, of which the following is a specification.

This invention has for its object to provide an automatic chuck of simple construction for screw-machines, in which the opening and closing movements of the chuck-jaws shall be radial or at right angles to the axis or longitudinal center of the chuck; and it consists in the improvements, which we will now proceed to describe and claim.

Of the accompanying drawings, forming a part of this specification, Figure 1 represents an end view of a chuck embodying our improvements. Fig. 2 represents a longitudinal section of the same.

The same letters of reference indicate the same parts in both figures.

In the drawings, $a$ represents the body of the chuck, which has an internal screw-thread at its rear end, and at its forward end is chambered at $b$ to receive a sliding sleeve $c$. Said sleeve has a cylindrical outer surface or periphery of uniform diameter from end to end, and has a sliding fit in the chamber. The inner surface of the sleeve is tapered, as shown, the tapered portion having the greatest diameter at the outer end of the sleeve, and being gradually reduced in diameter toward the inner end.

$d\ d\ d\ d$ represent the jaws, which may be of any suitable number, as two or more, four being the number in the present case. The backs of the jaws are segmental in cross-section and are inclined longitudinally, so that when the jaws are assembled their backs constitute a cone-frustum which fits the tapered inner surface of the sleeve $c$, the jaws being inserted loosely in said sleeve, as shown in Fig. 1. This form of the backs of the jaws is not absolutely essential, but it is necessary that a sufficient portion of each jaw be in contact with the tapered surface of the sleeve $c$ to insure a firm bearing of each jaw on the tapered surface and prevent rocking of the jaws. The jaws are retained in said sleeve by a retaining-collar $f$, screwed upon the externally-threaded outer end of the chuck-body, and having an inwardly-projecting flange $f'$, which extends over the outer ends of the jaws, as shown, said flange being arranged to permit the sleeve $c$ to slide longitudinally between it and the end of the sleeve-receiving chamber in the body of the chuck.

The jaws, when assembled in the body of the chuck, constitute so nearly a complete circle that each jaw is prevented from falling inwardly by contact with the edges of the adjoining jaws. The opening and closing movements of the jaws required to release and grasp a rod of a given size are but slight, so that the jaws do not have to be separated sufficiently to permit any jaw to fall through the space between the adjoining jaws.

$g\ g$ represent levers, which are pivoted at $h\ h$ in slots $i\ i$, formed in the chuck-body, and extending longitudinally thereof, the levers being formed and the pivots or fulcrums $h$ being arranged so as to give each lever a shorter arm 2 and a longer arm 3. The shorter arms 2 bear against the inner end of the internally-tapered sleeve $c$, while the longer arms are inclined outwardly and are in contact with studs $i'\ i'$, which are inserted in a sliding operating-ring $j$, fitted to slide on the chuck-body. The studs $i'$ are preferably screws inserted in tapped or screw-threaded holes in the operating-ring and made adjustable by their screw-threaded connection therewith, so that they may project any desired distance into the slots $i$ of the chuck-body.

It will be seen that when the operating-ring is moved backwardly on the chuck-body its studs $i'\ i'$, bearing on the inclined longer arms of the levers $g$, will turn said levers on their fulcrums, and thereby cause the shorter arms to force the jaw-surrounding sleeve $c$ forward. The tapered internal surface of the sleeve $c$ is thus caused to force the jaws radially inward upon the device to be held thereby, the jaws being prevented from moving endwise by the flange $f''$ of the retaining-collar $f$. The jaws are therefore moved inwardly at right angles with the axis of the chuck, and are thus prevented from displacing the article while grasping it, as they might do if their closing movement were not absolutely at right angles to the axis of the chuck.

The levers, divided into shorter and longer arms, as shown, enable the power applied to the operating-ring to be exerted to the best advantage in compressing or closing the jaws. It is obvious, however, that other suitable means may be employed for moving the levers $g\ g$, which operate the internally-tapered jaw-closing sleeve, our invention not being limited in this particular to the sliding operating-ring $j$.

It will be observed that by the employment of the loose jaws having no positive connection with the body of the chuck, the construction of the chuck is simpler than it would be if means were employed to positively connect the jaws with the chuck, and the jaws are enabled to be removed and replaced by new ones by unscrewing the retaining-collar $f$, the cost of renewing the jaws being thus reduced to the minimum, because only the jaws have to be discarded, whereas if the jaws were formed on a holder or tube adapted to be attached to the chuck-body said holder would have to be discarded with the jaws. By dispensing with a holder formed integral with the jaws we are enabled to reduce the length of the chuck to the minimum, no provision having to be made for the length of the holder.

We claim—

1. The chuck-body, the levers having longer and shorter arms pivoted thereto, means for moving said levers, the radially-movable jaws, and the sliding sleeve surrounding the jaws and tapered or wedge-shaped internally, said sleeve being in contact with the shorter arms of the levers, all combined substantially as set forth.

2. The combination of the chuck-body, the sliding sleeve therein, having a tapered or wedge-shaped inner surface, the loose or independent jaws inserted loosely in said sleeve and having their backs shaped to conform to said tapered surface, the latter preventing inward endwise movement or displacement of the loose jaws, the flanged collar screwed upon the body to prevent outward endwise movement or displacement of the jaws, and means for moving said sleeve to compress the jaws, as set forth.

3. The combination of the chuck-body having longitudinal slots, the levers pivoted in said slots and having the inclined arms, the sliding sleeve operated by said levers within the body, the jaws within said sleeve, and studs or projections carried by a slide or ring and bearing on the inclined arms of the levers, as set forth.

In testimony whereof we have signed our names to this specification, in the presence of two subscribing witnesses, this 27th day of December, A. D. 1888.

JAMES HARTNESS.
ELISHA F. SPAULDING.

Witnesses:
MERRILL L. LAWRENCE,
A. M. ALLBE.